United States Patent
Akiba

(10) Patent No.: US 9,915,999 B2
(45) Date of Patent: Mar. 13, 2018

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Tomohiro Akiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 14/569,379

(22) Filed: Dec. 12, 2014

(65) Prior Publication Data

US 2015/0169027 A1 Jun. 18, 2015

(30) Foreign Application Priority Data

Dec. 17, 2013 (JP) .................... 2013-260525

(51) Int. Cl.
*G06F 1/32* (2006.01)

(52) U.S. Cl.
CPC .......... *G06F 1/3284* (2013.01); *G06F 1/3209* (2013.01); *Y02B 60/1267* (2013.01)

(58) Field of Classification Search
None
See application file for complete search history.

(56) References Cited

U.S. PATENT DOCUMENTS

| 7,093,131 | B1 * | 8/2006 | Kobayashi | H04L 9/3247 380/258 |
| 9,119,160 | B2 * | 8/2015 | Hall | H04W 52/0277 |
| 2003/0097585 | A1 * | 5/2003 | Girard | G06F 21/575 726/19 |
| 2008/0127311 | A1 * | 5/2008 | Yasaki | G06F 21/35 726/4 |
| 2009/0210931 | A1 * | 8/2009 | Hashimoto | G06F 21/35 726/4 |
| 2010/0117807 | A1 * | 5/2010 | Yokoo | G06K 19/0707 340/10.5 |

(Continued)

FOREIGN PATENT DOCUMENTS

| JP | 2011-028615 A | 2/2011 |
| JP | 2011-044092 A | 3/2011 |

(Continued)

*Primary Examiner* — Paul J Yen
(74) *Attorney, Agent, or Firm* — Canon U.S.A., Inc. IP Divison

(57) ABSTRACT

An information processing apparatus operable in a first power state and a second power state includes a noncontact communication unit configured to be driven by power of a radio wave from a mobile terminal and to communicate with the terminal, a storage unit configured to store data necessary for authentication, which the noncontact communication unit has received from the terminal in the second power state, a control unit configured to recover, when the noncontact communication unit receives data from the terminal in the second power state, the information processing apparatus from the second power state to the first power state, and a transmission unit configured to transmit, after the information processing apparatus has been recovered to the first power state by the control of the control unit, the data necessary for authentication stored in the storage unit to an authentication unit.

18 Claims, 5 Drawing Sheets

(56) References Cited

U.S. PATENT DOCUMENTS

| | | | | |
|---|---|---|---|---|
| 2010/0169686 A1* | 7/2010 | Ryoo | ............... | G06F 9/54 |
| | | | | 713/323 |
| 2012/0042363 A1* | 2/2012 | Moosavi | ............... | H04L 9/3228 |
| | | | | 726/5 |
| 2014/0181535 A1* | 6/2014 | Smith | ............... | H04W 12/06 |
| | | | | 713/300 |

FOREIGN PATENT DOCUMENTS

| | | |
|---|---|---|
| JP | 2011-060046 A | 3/2011 |
| JP | 2012-040820 A | 3/2012 |

* cited by examiner

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

An information processing apparatus such as an image forming apparatus has hitherto been provided with an authentication function for controlling permission/inhibition of use for a user. One of such methods uses a Radio Frequency Identification (RFID) tag. According to this method, in the image forming apparatus that includes a tag reader/writer, information is read from an integrated circuit (IC) card which a RFID tag has been embedded in and which has come close, and then authentication is performed based on the information.

However, this method needs power for operating the reader/writer. As a result, when a device is set in a power saving state, the authentication function does not operate unless power is supplied to the reader/writer. On the other hand, when power is supplied to the reader/writer, the device is not set in a sufficient power saving state.

In recent years, a technology referred to as Near Field Communication (NFC) that is one of near field wireless communication units (or noncontact communication units) compatible to the RFID has started to be mounted in a mobile terminal such as a smartphone or a tablet personal computer (PC).

Three operation modes are defined according to NFC specifications. A first is a reader/writer mode that enables an operation equivalent to that of the reader/writer. A second is a card emulation mode that enables an operation equivalent to that of the RFID tag. A third is a peer-to-peer mode that enables transmission/reception of various data via the NFC. In the NFC, an operation can be performed while switching these modes.

There has been offered a technology for compensating for an issue when the reader/writer is used in the power saving mode of the device by switching the operation modes in the NFC as discussed in Japanese Patent Application Laid-Open No. 2011-60046 (JP 2011-60046). According to the technology discussed in JP 2011-60046, a noncontact communication device operates in the reader/writer mode when power has been supplied from an apparatus, and in the card emulation mode when power has been supplied from a battery. During the operation in the card emulation mode, the noncontact communication device transmits information regarding the apparatus to a communication partner. This enables transmission of information of some type even in the power saving state.

However, according to the aforementioned conventional technology, it is only the information of the device that is transmitted to the communication partner. When a user logs in to use the apparatus in the power saving state, the user must perform a recovery operation in order to make the apparatus recover from the power saving state. To perform authentication after the recovery, the user must hold up the mobile terminal again to the device. Thus, the technology lacks convenience. In the mobile terminal, which of the card emulation mode and the reader/writer mode should be used to carry out communication is not uniquely determined. As a result, an operation is cumbersome for the user, and user's operation time may increase.

SUMMARY OF THE INVENTION

The present invention is directed to a mechanism for improving power saving and user's convenience by enabling user authentication only by requiring the user to hold up a mobile terminal once even in a power saving state of an information processing apparatus.

According to an aspect of the present invention, an information processing apparatus operable in a first power state and a second power state in which power consumption is smaller than the first power state includes a noncontact communication unit configured to be driven by power of a radio wave from a mobile terminal and to communicate with the mobile terminal, a storage unit configured to store data necessary for authentication, which the noncontact communication unit has received from the mobile terminal in the second power state of the information processing apparatus, a control unit configured to recover, when the noncontact communication unit receives data from the mobile terminal in the second power state of the information processing apparatus, the information processing apparatus from the second power state to the first power state, and a first transmission unit configured to transmit, after the information processing apparatus has been recovered from the second power state to the first power state by the control of the control unit, the data necessary for authentication stored in the storage unit to an authentication unit.

Further features and aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
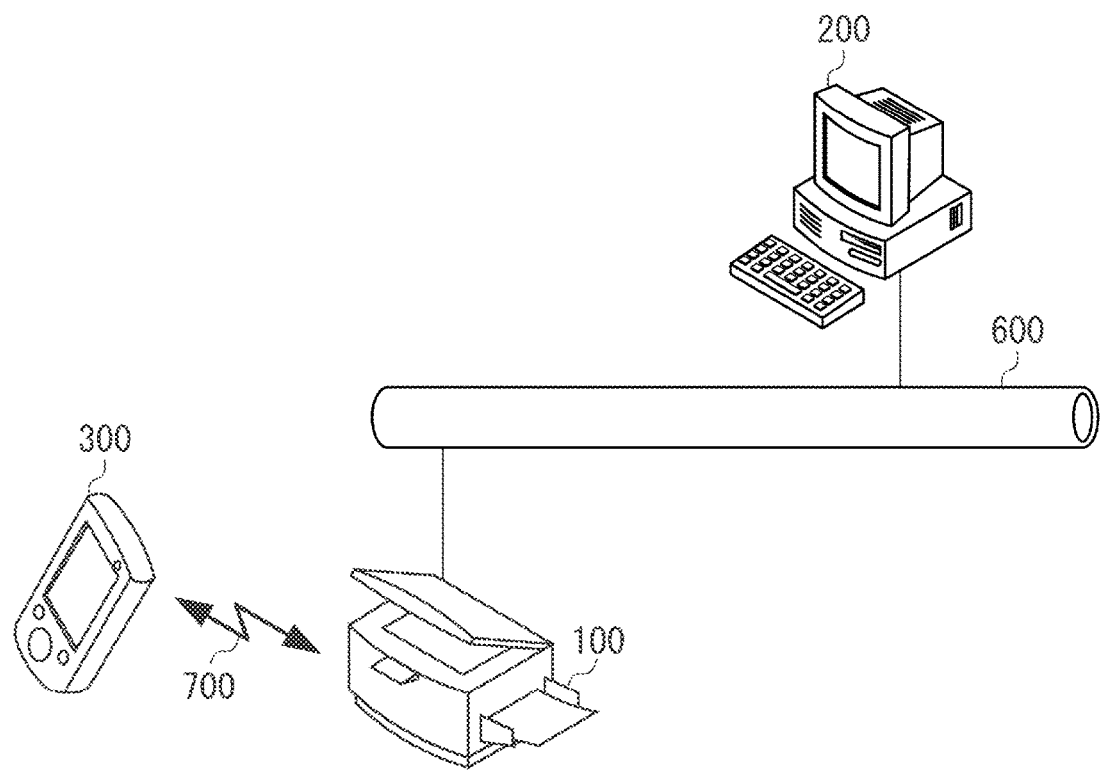
FIG. 1 is a diagram illustrating an overall configuration of an information processing system according to the present invention.

FIG. 1 is a diagram illustrating an example of an overall configuration of an information processing system to which an information processing apparatus according to an embodiment of the present invention is applicable.

This information processing system includes an image forming apparatus 100, a personal computer (PC) 200, a mobile terminal 300, and a local area network (LAN) 600.

The image forming apparatus 100 has copying, printing and scanning functions, and an authentication function of a user of these functions. Identification information of the user is recorded in the mobile terminal 300, and user authentication is performed by using the ID information.

The image forming apparatus 100 receives the ID information of the user recorded in the mobile terminal 300 via NFC communication 700, and the user authentication is performed based on an authentication database (not illustrated) stored in the image forming apparatus 100. The NFC communication 700 indicates communication compliant with a NFC standard.

A configuration where the image forming apparatus 100 stores the authentication database and the user authentication is performed has been described. However, a configuration where the image forming apparatus 100 requests the user authentication to a server (not illustrated) may be employed. In other words, the information processing system may employ a configuration where a server (not illustrated) for storing the ID information of the user to execute authentication processing is separately prepared, the image forming apparatus 100 transmits the ID information to the server via the LAN 600, and the server executes the authentication processing.

The PC 200 transmits a print job to the image forming apparatus 100. The PC 200 can refer to data digitized by the image forming apparatus 100. The mobile terminal 300 is a portable information processing terminal such as a smartphone or a tablet PC that has a NFC communication function or the like.

The mobile terminal 300 can carry out communication with the image forming apparatus 100 via the NFC communication 700. Information transmitted/received through communication between the mobile terminal 300 and the image forming apparatus 100 may be an Internet Protocol (IP) address or the ID information of the user. The LAN 600 is a network realized by Ethernet® or the like. The image forming apparatus 100 and the PC 200 are interconnected via the LAN 600.

Figure 2A:
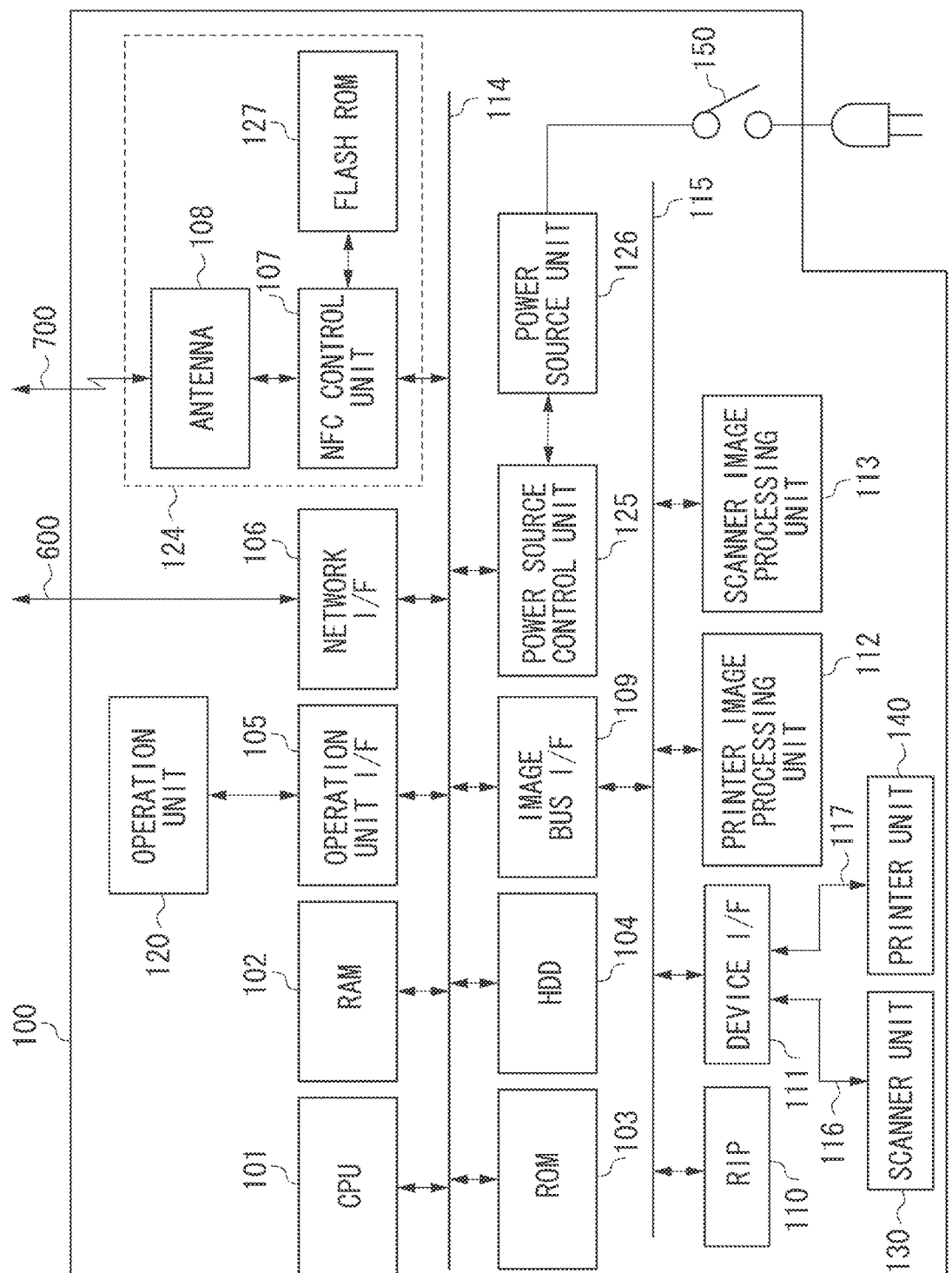
FIGS. 2A and 2B are block diagrams respectively illustrating a configuration of an image forming apparatus, and a power supply state in a power saving state of the image forming apparatus.

FIG. 2A is a block diagram illustrating an example of a configuration of the image forming apparatus 100.

Figure 2B:
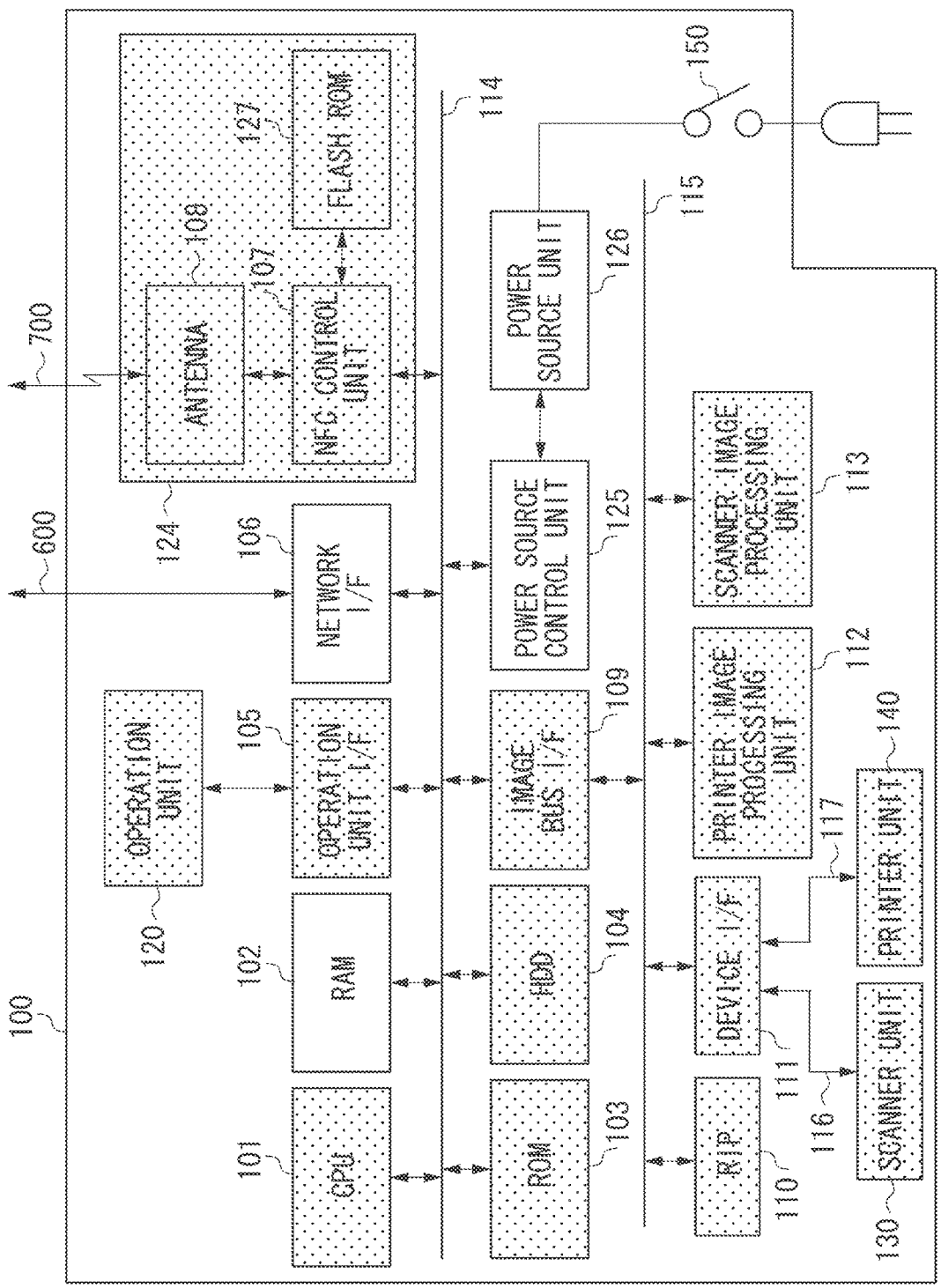

FIG. 2B is a diagram illustrating a power supply state in a power saving state of the image forming apparatus 100.

A central processing unit (CPU) 101 is responsible for overall control of the image forming apparatus 100. A random access memory (RAM) 102 is a memory for developing a program to be executed by the CPU 101. The RAM 102 is also a work memory for temporarily storing data used for calculation by the CPU 101.

A read-only memory (ROM) 103 stores a program used for activating the image forming apparatus 100, and is mainly used when the image forming apparatus 100 is activated. A hard disk drive (HDD) 104 stores software or various types of settings regarding the control of the image forming apparatus 100, or stored documents. In place of the HDD, other storage devices such as a Solid State Drive may be provided.

An operation unit 120 is a user interface for inputting/outputting information between the image forming apparatus 100 and the user. An operation interface (I/F) 105 is an interface for the operation unit 120, and relays data to be input/output to the operation unit 120. A network I/F 106 is an interface for transmitting/receiving data with an external device via the LAN 600.

An NFC communication unit 124 is a communication unit based on the NFC standard and configured to perform the NFC communication 700 with the mobile terminal 300. In other words, the NFC communication unit 124 is a near field wireless communication unit (or noncontact communication unit) compatible to the RFID. The NFC communication unit 124 includes a NFC control unit 107, an antenna 108, and a flash ROM 127. Hereinafter, the NFC communication unit 124 will be described.

The NFC control unit 107 executes control to perform the NFC communication 700. The antenna 108 is an antenna for performing the NFC communication 700, and transmits/receives a radio wave generated through the NFC communication 700 with the external device (e.g., mobile terminal 300).

The flash ROM 127 is connected to the NFC control unit 107, and used for temporarily storing data to be processed by the NFC control unit 107. The image forming apparatus 100 according to the present exemplary embodiment uses the flash ROM 127 for temporarily storing the data to be processed by the NFC control unit 107. Not limited to this, however, another nonvolatile memory or a combination of a battery and a static RAM (SRAM) may be applied.

A power source control unit 125 is a block for controlling a power supply state of the image forming apparatus 100, and controls power by a user's operation of a power switch 150. The power source control unit 125 can detect a power-OFF operation carried out by the power switch 150, and notify the CPU 101 of a detected result as a power-OFF request. A power source unit 126 converts alternating-current (AC) power supplied to the image forming apparatus 100 into direct-current (DC) power, and turns ON/OFF a conversion operation according to an instruction from the power source control unit 125.

The power source control unit 125 switches at least a normal power state and a power saving state, in which power saving can be performed more than the normal power state, to execute control. In the normal power state, power is supplied to each block illustrated in FIG. 2A. In the power saving state, for example, as illustrated in FIG. 2B, power is supplied only to the minimum necessary of the image forming apparatus 100. For example, power is supplied only to the RAM 102, the network I/F 106, and the power source control unit 125.

The CPU 101 executes, for example, when it has received a power-OFF request from the PC 200 via the LAN 600, shutdown processing, and stores information indicating that the image forming apparatus 100 shifts to a power-OFF state by remote control in the flash ROM 127 via the NFC control unit 107. When executing the shutdown processing by timer control, the CPU 101 stores information indicating that the image forming apparatus 100 shifts to the power-OFF state by timer control in the flash ROM 127 via the NFC control unit 107. When executing the shutdown processing after turning-OFF of the power switch 150, the CPU 101 stores information indicating that the image forming apparatus 100 shifts to the power-OFF state by an operation of the power 150 in the flash ROM 127 via the NFC control unit 107. When the image forming apparatus 100 has been activated by a power-ON operation of the power switch 150, the CPU 101 stores information indicating that the image forming apparatus 100 has shifted to the normal power state in the flash ROM 127 via the NFC control unit 107. When changing to the power saving state, the CPU 101 stores information indicating that the image forming apparatus 100 shifts to the power saving state in the flash ROM 127 via the NFC control unit 107. When the image forming apparatus 100 has recovered from the power saving state to the normal power state, the CPU 101 stores information indicating that the image forming apparatus 100 has recovered to the normal power state in the flash ROM 127 via the NFC control unit 107. That is to say, the CPU 101 stores information indicating a power state of the image forming apparatus 100 in the flash ROM 127 in accordance with transition of the power state of the image forming apparatus 100.

The CPU 101 may store, when an error or a warning has occurred in the image forming apparatus 100, information indicating a content of the error or the warning in the flash ROM 127. In the case of this configuration, when the error or the warning has been removed, the CPU 101 deletes from the flash ROM 127 the information indicating the content of the error or the warning stored in the flash ROM 127.

The CPU 101, the RAM 102, the ROM 103, the HDD 104, the operation unit I/F 105, the network I/F 106, the NFC control unit 107, and the power source control unit 125 are interconnected via a system bus 114. An image bus I/F 109 is responsible for relaying data between the system bus 114 and an image bus 115 for interconnecting respective blocks for image processing, and for converting a data structure.

A raster image processor (RIP) 110, a device I/F 111, a printer image processing unit 112, and a scanner image processing unit 113 are connected to the image bus 115. The RIP 110 converts a page-descriptive language (PDL) code or a display list into a bitmap image.

The device I/F 111 is an interface for connecting a scanner unit 130 and a printer unit 140 to the image bus 115. The device I/F 111 adjusts timing of transmitting image data 116 received from the scanner unit 130 to the image bus 115 and timing of transmitting image data 117 from the image bus 115 to the printer unit 140.

The scanner image processing unit 113 executes processing such as correction or resolution processing for the image data input from the scanner unit 130 according to the image forming apparatus 100. The printer image processing unit 112 executes processing such as correction or resolution conversion for image data to be printed out according to a print engine of the printer unit 140.

The NFC communication unit 124 is operable in a card emulation mode, a reader/writer mode, and a peer-to-peer mode. In the card emulation mode, the NFC communication unit 124 performs an operation equivalent to that of the RFID tag to play a role of a noncontact IC card. In the reader/writer mode, the NFC communication unit 124 performs an operation equivalent to that of the reader/writer, and can read or write information from or in the RFID tag (tag corresponding to NFC standard) that has come close. In the peer-to-peer mode, the NFC communication unit 124 can transmit/receive various data with other NFCs.

In the reader/writer mode and the peer-to-peer mode, the NFC communication unit 124 operates by power supplied from the power source unit 126. In the card emulation mode, the NFC communication unit 124 operates by power of a radio wave from the tag reader/writer. Accordingly, in the card emulation mode, the NFC communication unit 124 is operable even in an OFF state of the power switch 150 of the image forming apparatus 100 (power-OFF state of image forming apparatus 100). Even when no power is supplied to the NFC communication unit 124 in the power saving state (sleep state) of the image forming apparatus 100, the NFC communication unit 124 is operable in the card emulation mode. Thus, in the card emulation mode, power can be saved more than power saved in the reader/writer and peer-to-peer modes.

Now, user authentication processing using the NFC, which is a characteristic operation according to the present exemplary embodiment, will be described referring to FIGS. 3 and 4.

Figure 3:
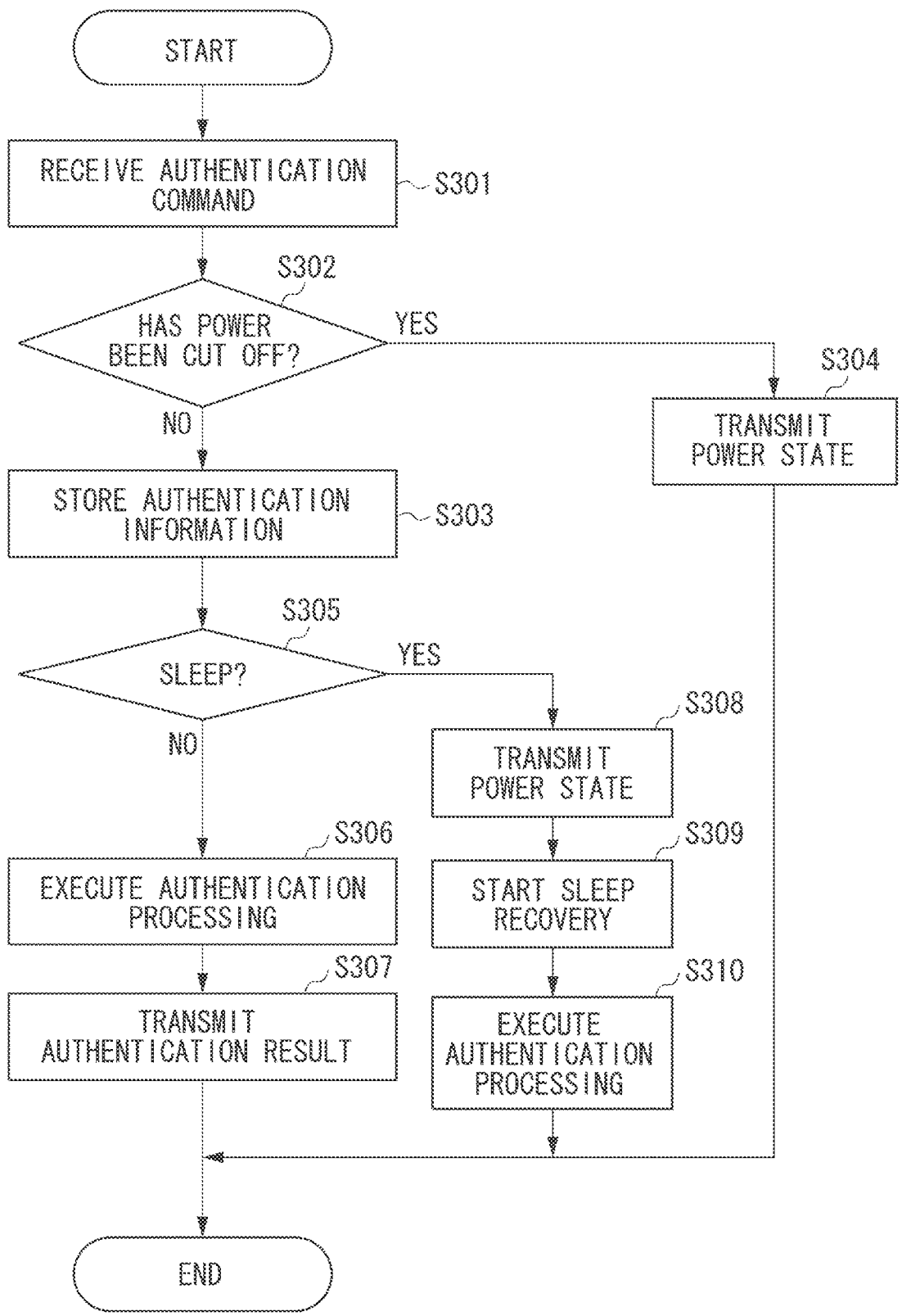
FIG. 3 is a flowchart illustrating an example of an operation of the image forming apparatus.

FIG. 3 is a flowchart illustrating an example of an operation of the image forming apparatus 100, particularly corresponding to the user authentication processing using the NFC. Processing of steps S301 to S305, S308 and S309 is achieved by executing, via the NFC control unit 107, a program stored in a ROM (not illustrated) therein or in the flash ROM 127. Processing of steps S306, S307 and S310 is achieved by executing, via the CPU 101, a program stored in the ROM 103 or the HDD 104.

Figure 4:
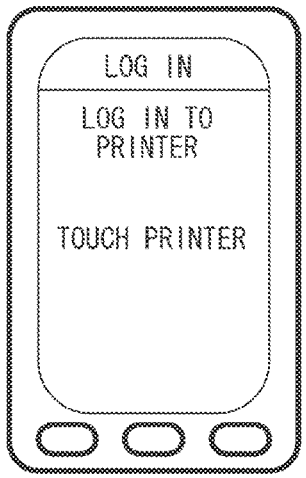
FIG. 4 is a diagram illustrating screen display examples of a mobile terminal.
Figure 4:
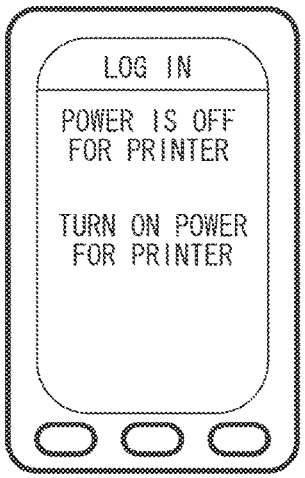
Figure 4:
Figure 4:
Figure 4:
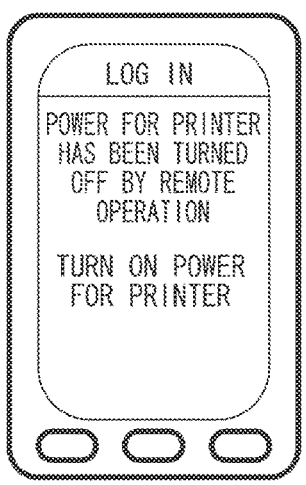
Figure 4:
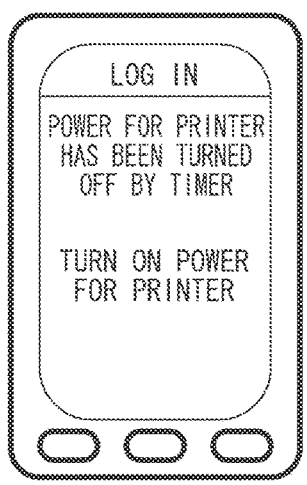

FIG. 4 is a diagram illustrating screen display examples of the mobile terminal 300. The screens illustrated in FIG. 4 are controlled for displaying by executing, via a CPU (not illustrated) of the mobile terminal 300, a program stored in the ROM.

At the time of activating the image forming apparatus 100, the CPU 101 instructs the NFC control unit 107 to operate in the card emulation mode. According to this instruction, the NFC control unit 107 fixes an operation mode to the card emulation mode, and then stands by. The NFC control unit 107 operates, when it has received a radio wave from the mobile terminal 300 in the card emulation mode, by power of the radio wave from the mobile terminal 300, and starts processing. The user operates the mobile terminal 300 to start an application for logging in to the image forming apparatus 100. The started application sets the NFC in the mobile terminal 300 in the reader/writer mode. The application displays a screen similar to a screen 401 illustrated in FIG. 4 on a display unit of the mobile terminal 300, thereby prompting the user to touch (bring close or hold up) the mobile terminal 300 to the NFC communication unit 124 of the image forming apparatus 100.

Any message can be displayed on the screen 401 as long as it notifies the user of permission of logging in to the image forming apparatus 100 by touching (holding up) the mobile terminal 300 to the NFC communication unit 124 of the image forming apparatus 100. For example, an illustration or a moving image, which indicates a logging-in operation carried out by touching (holding up) the mobile terminal 300 to the NFC communication unit 124 of the image forming apparatus 100, may be displayed on the screen 401.

When the mobile terminal 300 comes sufficiently close to the antenna 108, the NFC control unit 107 is driven by the power of the radio wave from the mobile terminal 300. In step S301, simultaneously with the driving, the NFC control unit 107 receives an authentication command transmitted from the mobile terminal 300 via the NFC communication 700.

In step S302, after the reception of the authentication command in step S301, the NFC control unit 107 refers to the power state stored in the flash ROM 127 to determine whether the image forming apparatus 100 is in a power-OFF state. When the image forming apparatus 100 is determined to be in the power-OFF state (YES in step S302), in step S304, the NFC control unit 107 transmits information indicating the power-OFF state of the image forming apparatus 100 to the mobile terminal 300 via the NFC communication 700. The mobile terminal 300 that has received the information displays a screen 402 by the application, and prompts the user to turn ON the power switch 150 of the image forming apparatus 100 (supply power to image forming apparatus 100). Any message may be displayed on the screen 402 as long as it prompts the user to turn ON the power switch 150 of the image forming apparatus 100. For example, a message including information indicating a reason for the power-OFF state of the image forming apparatus 100 such as "Power for printer has been turned OFF by remote operation. Turn ON power for printer" on a screen 402-2 or "Power for printer has been turned OFF by timer. Turn ON power for printer" on a screen 402-3 may be displayed. After step S304, the NFC control unit 107 ends the processing of the flowchart.

On the other hand, when the image forming apparatus 100 is determined not to be in the power-OFF state (NO in step S302), in step S303, the NFC control unit 107 stores authentication information included in the authentication command received in step S301 in the flash ROM 127.

In step S305, the NFC control unit 107 determines whether a power state of the image forming apparatus 100 is a power saving state (sleep). Such determination is made based on the power state stored in the flash ROM 127 and referred to in step S302. When the image forming apparatus 100 is determined to be in the power saving state (YES in step S305), in step S308, the NFC control unit 107 transmits information indicating the power saving state of the image forming apparatus 100 to the mobile terminal 300 via the NFC communication 700. The mobile terminal 300 that has received the information displays a screen 403 by the application, and prompts the user to stand by until sleep recovery processing is completed. Any message may be displayed on the screen 403 as long as it prompts the user to stand by until the sleep recovery processing is completed.

After the transmission of the information indicating the power state to the mobile terminal 300, in step S309, the NFC control unit 107 instructs the power source control unit 125 to recover from the power saving state. According to this instruction, the power source control unit 125 recovers the image forming apparatus 100 from the power saving state. After the recovery, in step S310, the CPU 101 acquires the authentication information stored in the flash ROM 127 via the NFC control unit 107 to execute authentication processing. It takes time until completion of the authentication processing, and thus an authentication result may not be transmitted to the mobile terminal 300 (needless to say, may be transmitted). The CPU 101 displays a message reflecting the authentication result for the operation unit 120.

When the image forming apparatus 100 is determined not to be in the power saving state (NO in step S305), the NFC control unit 107 determines that the image forming apparatus 100 is in a normal power state to entrust control to the CPU 101. In step S306, the CPU 101 executes the same authentication processing as that in step S310. In step S307, the CPU 101 transmits the authentication result of step S306 to the mobile terminal 300 via the NFC communication 700. The mobile terminal 300 that has received such information displays a screen 404 by the application, and transmits a message indicating operation permission to the user. Any message may be displayed on the screen 404 as long as the user can be notified of operation permission.

When the authentication processing has been carried out in step S310 or S306, the CPU 101 may delete the authentication information stored in the flash ROM 127.

According to the present exemplary embodiment, the power state is stored in the flash ROM 127. Not limited to this, however, the information indicating the power state may be acquired by a method for making an inquiry to the power control unit 125 by the NFC control unit 107 each time. A difference in operation depending on an authentication method or a success/failure of authentication is not important in the present invention, and thus detailed description thereof will be omitted. When the authentication succeeds, the CPU 101 permits the user to use the image forming apparatus 100. On the other hand, when the authentication fails, the CPU 101 executes control to reject user's use of the image forming apparatus 100.

When there is stored in the flash ROM 127 information indicating occurrence of an error or a warning in the image forming apparatus 100, in step S304, S307, or S308, information indicating the occurrence of the error or the warning may be transmitted to the mobile terminal 300.

As described above, the image forming apparatus 100 according to the present exemplary embodiment is an information processing apparatus that includes the NFC communication unit 124 including the flash ROM 127 and executes authentication by the mobile terminal 300 such as a smartphone. The NFC communication unit 124 is operated in the card emulation mode, the authentication information received from the mobile terminal 300 in the power saving state is stored in the flash ROM 127, the apparatus is recovered from the power saving state, and the authentication is carried out based on the authentication information stored in the flash ROM 127 after the recovery. Thus, irrespective of the power saving state or the normal power state of the image forming apparatus 100, the user authentication can be performed only by necessitating the user to consistently hold up the mobile terminal once. Therefore, user convenience can be improved. The NFC communication unit 124 of the image forming apparatus 100 is fixed in the card emulation mode to stand by. Accordingly, the operation mode of the NFC communication unit 124 of the mobile terminal 300 is uniquely determined in the reader/writer mode. Therefore, an increase of user's operation time of the mobile terminal 300 can be prevented. As a result, user convenience can be improved in the mobile terminal 300 as well.

The present embodiment has been directed to the image forming apparatus that includes the NFC communication unit. However, not limited to the image forming apparatus, the present invention can be applied to any information processing apparatus as long as it includes a NFC communication unit.

Structures and contents of various types of data are not limited to the aforementioned. Needless to say, various structures and contents can be employed according to purposes or objects.

The exemplary embodiment has been described so far. However, the present invention can employ an embodiment of a system, an apparatus, a method, a program, or a storage medium. Specifically, the present invention can be applied to a system including a plurality of devices. The present invention can be applied to an apparatus including one device.

Configurations combining each of the exemplary embodiments are all within the scope of the present invention.

The present invention can be realized by executing the following processing. Software (program) for achieving the functions of the above described exemplary embodiment is supplied to a system or an apparatus via a network or various types of storage media, and a computer (CPU, or microprocessing unit (MPU)) of the system or the apparatus reads the program to execute it.

The present invention is not limited to the above exemplary embodiment. Various modifications (including organic combinations of the exemplary embodiments) can be made based on the gist of the invention, which are all within the scope of the present invention. In other words, configurations combining each of the exemplary embodiments and modified examples thereof are all within the scope of the present invention.

According to the present invention, even when an information processing apparatus is in a power saving state, user authentication can be performed only by holding up a mobile terminal once by a user, and thereby power saving and user convenience can be improved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-260525 filed Dec. 17, 2013, which is hereby incorporated by reference herein in its entirety.

What is claimed is:

1. An information processing apparatus comprising:
a near field communication unit which communicates with a mobile terminal wirelessly;
a storage which stores data;
a control unit which authenticates users; and
a power control unit which controls power supply to the control unit,
wherein, when a user holds the mobile terminal over the near field communication unit, the near field communication unit operates with power supplied from the mobile terminal, receives authentication data from the mobile terminal, stores the authentication data into the storage, and outputs a recovery instruction to the power control unit,
wherein the power control unit performs control so that the power is supplied to the control unit based on receiving the recovery instruction, and then
wherein the control unit receives the authentication data from the storage and authenticates the users by using the received authentication data.

2. The information processing apparatus according to claim 1, wherein the near field communication unit communicates with the mobile terminal wirelessly in a card emulation mode.

3. The information processing apparatus according to claim 1, wherein the near field communication unit transmits information indicating a power state of the information processing apparatus to the mobile terminal.

4. The information processing apparatus according to claim 1, wherein the control unit is a main CPU of the information processing apparatus.

5. The information processing apparatus according to claim 1, wherein the near field communication unit transmits an IP address to the mobile terminal.

6. The information processing apparatus according to claim 1, wherein the near field communication unit communicates with the mobile terminal in accordance with a near field communication (NFC) standard.

7. The information processing apparatus according to claim 1, wherein the near field communication unit is set in a card emulation mode when the information processing apparatus is in a sleep state in which power to the control unit is stopped.

8. The information processing apparatus according to claim 1, further comprising an image forming unit configured to form an image on a sheet.

9. The information processing apparatus according to claim 1, wherein the storage is a flash read-only memory (ROM).

10. The information processing apparatus according to claim 1, further comprising:
an authentication database,
wherein the control unit authenticates the users using the received authentication data and the authentication database.

11. The information processing apparatus according to claim 1, wherein the information processing apparatus is able to communicate with an external authentication database,
wherein the control unit authenticates the users using the received authentication data and the external authentication database.

12. A method for controlling an information processing apparatus including a near field communication unit which communicates with a mobile terminal wirelessly, the method comprising:
when a user holds the mobile terminal over the near field communication unit, supplying power to the near field communication unit from the mobile terminal;
receiving, by the near field communication unit, authentication data from the mobile terminal;
storing, by the near field communication unit, the authentication data into storage; and
outputting, by the near field communication unit, a recovery instruction,
wherein a power control unit, based on receiving the recovery instruction, performs control so that the power is supplied to a control unit, and then the control unit receives the authentication data from the storage and authenticates the users by using the received authentication data.

13. The method for controlling the information processing apparatus according to claim 12, wherein the near field communication unit communicates with the mobile terminal wirelessly in a card emulation mode.

14. The method for controlling the information processing apparatus according to claim 12, wherein the near field communication unit transmits information indicating a power state of the information processing apparatus to the mobile terminal.

15. The method for controlling the information processing apparatus according to claim 12, wherein the control unit is a main CPU of the information processing apparatus.

16. The method for controlling the information processing apparatus according to claim 12, wherein the near field communication unit communicates with the mobile terminal in accordance with an NFC standard.

17. The method for controlling the information processing apparatus according to claim 12, wherein the near field communication unit is set in a card emulation mode when the information processing apparatus is in a sleep state in which power to the control unit is stopped.

18. The method for controlling the information processing apparatus according to claim 12, further comprising forming an image on a sheet.

\* \* \* \* \*